Dec. 26, 1961     I. C. JACOBSON     3,014,984
UNDERWATER TELEVISION DEVICE
Filed Nov. 10, 1958     3 Sheets-Sheet 3
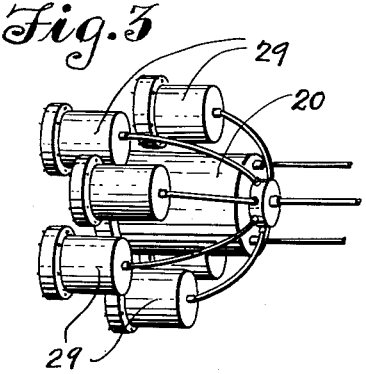
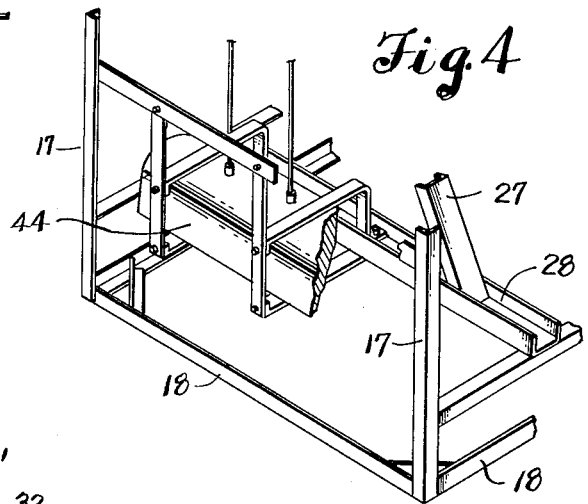
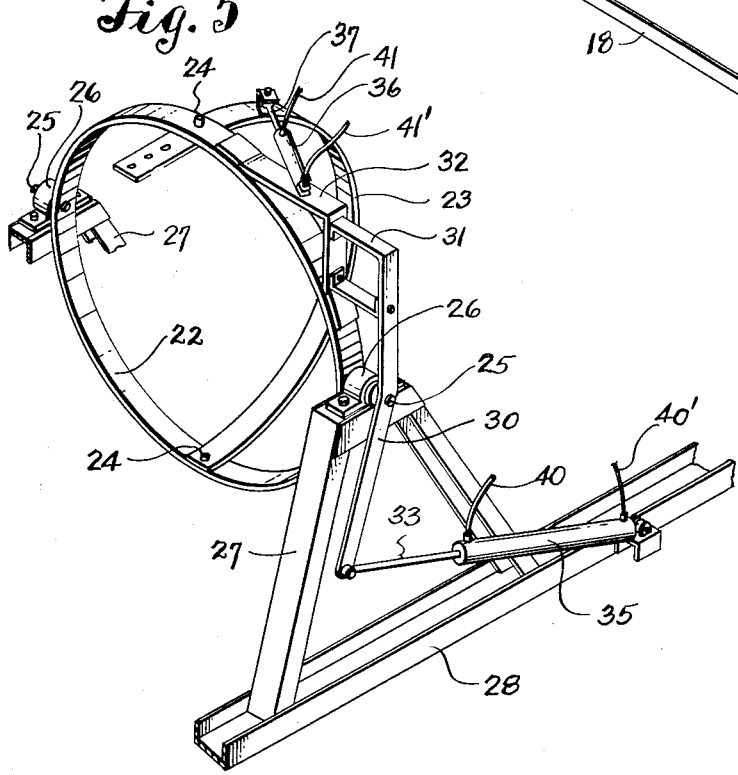
INVENTOR.
IRENUS C. JACOBSON
BY
Robinson & Berry
ATTORNEYS

United States Patent Office 3,014,984
Patented Dec. 26, 1961

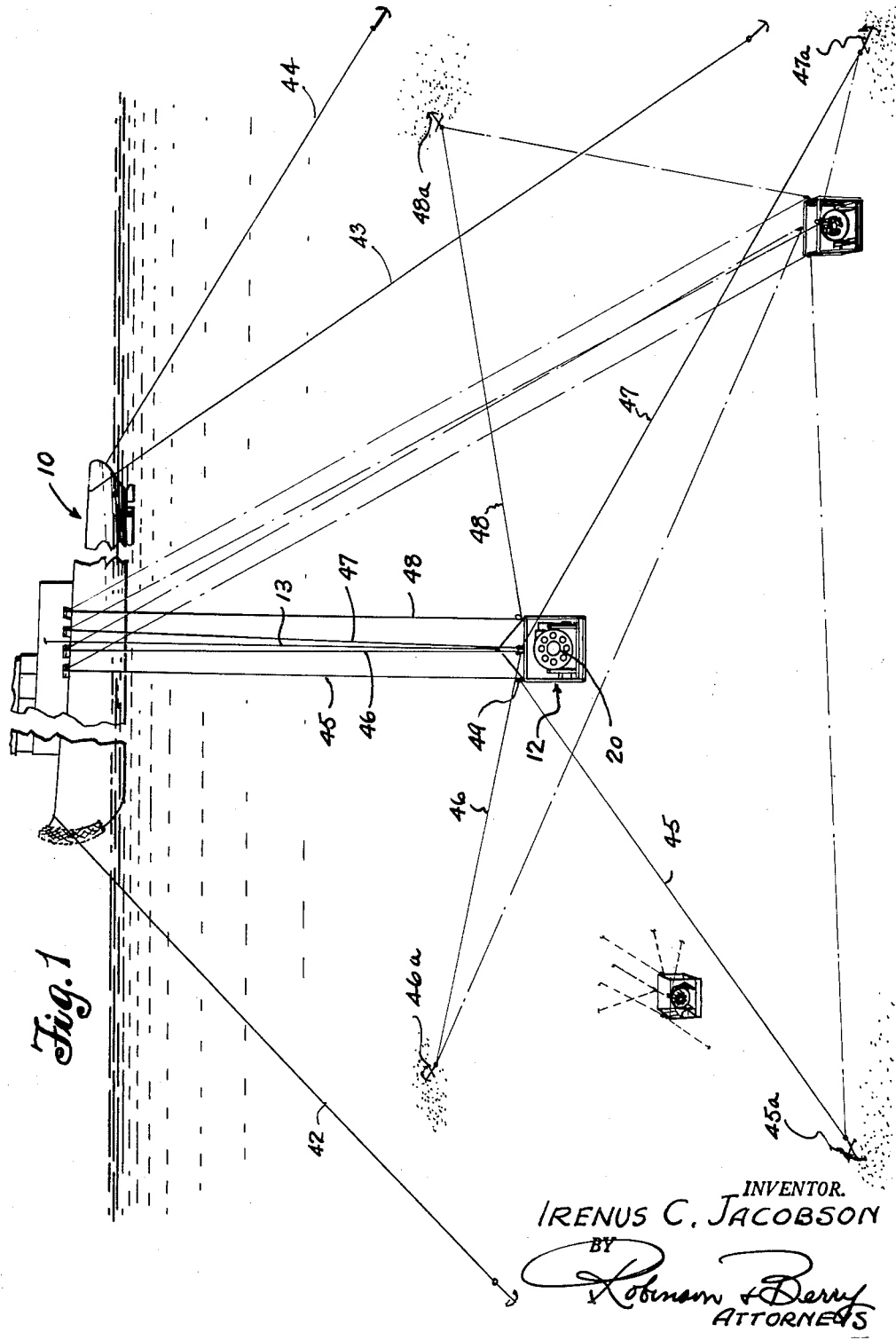

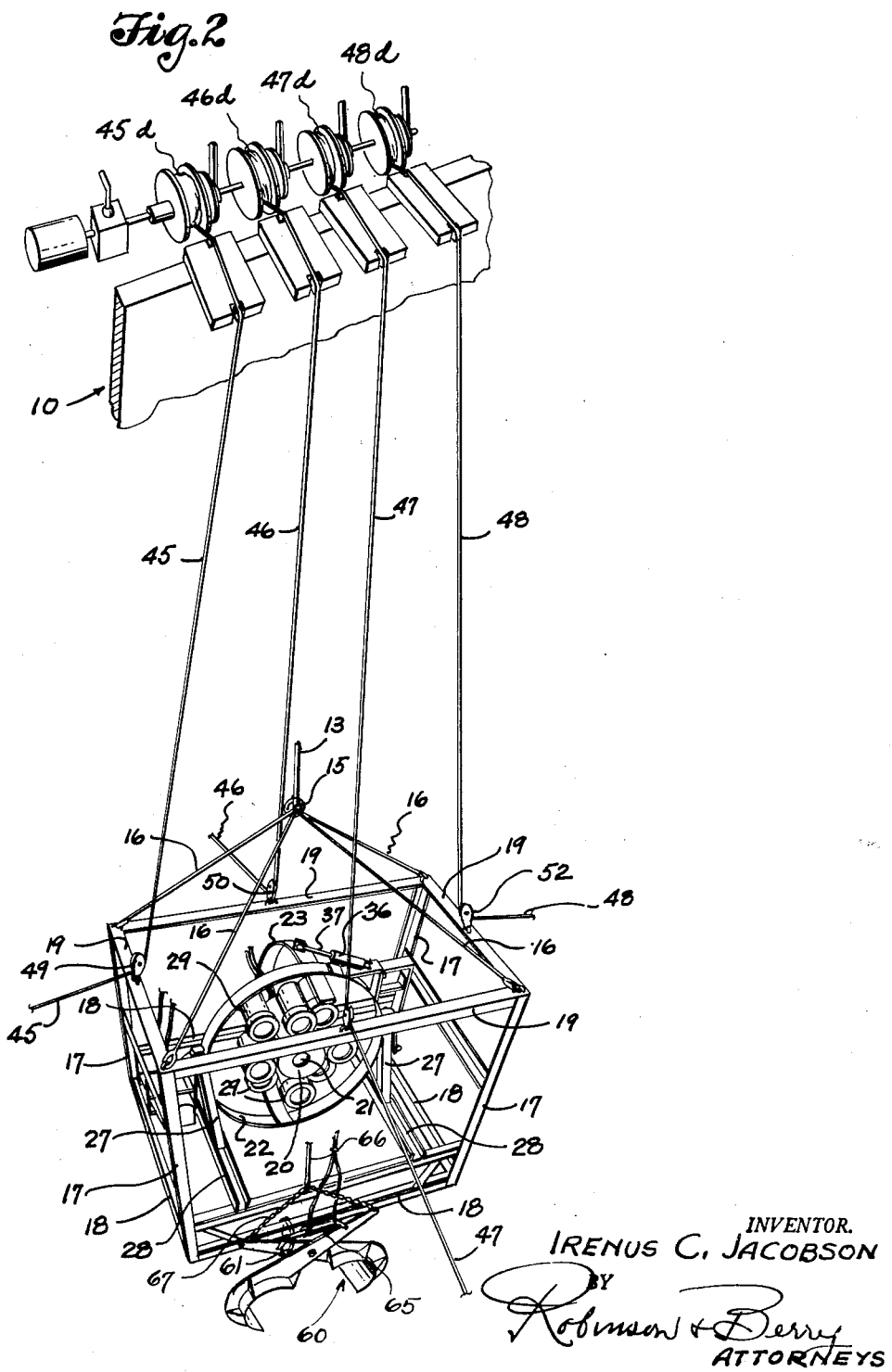

3,014,984
UNDERWATER TELEVISION DEVICE
Irenus C. Jacobson, 6533 19th NE., Seattle 15, Wash.
Filed Nov. 10, 1958, Ser. No. 773,115
7 Claims. (Cl. 178—6.8)

This invention relates to improvements in underwater and submarine scanning means of those types employing an underwater television camera and a surface receiver in conjunction with underwater illuminating means and camera suspension and directing means whereby the moving and positioning of the camera for scanning in a designated underwater area may be accomplished. More particularly, the present invention relates to improvements in the means for mounting the television camera, the illuminating means as associated therewith and various other devices or instrumentalities that are employed in close association with the camera, and in the arrangement and anchoring of various cables or lines for controlling, from the surface, the locating of the camera in a designated area and in the means for effecting its scanning movements.

It is one of the principal objects of the present invention to provide an improved scanning apparatus of the above stated character wherein the television camera, the illumination providing lamps and various accessary devices and instruments employed in close association therewith are mounted in and protectively enclosed by an open cage to which the suspending cable and the locating or maneuvering lines have connections to provide for their use in conjunction with cable winding means located on a surface vessel or place of remote control, whereby greater maneuverability and accuracy in the placement of the camera than heretofore possible may be obtained without change in location of the surface vessel from which the mechanism is suspended.

It is a further object of the present invention to provide a novel means for the mounting of the camera and the illuminating means in the protective cage and for effecting the tilting and scanning movements and corresponding changes of lamp direction.

Yet another object of this invention resides in the provision of a novel arrangement of lines or cables in connection with the protective cage whereby its directional movement and position of use may be controlled with greater accuracy and the range of its travel at any setting of the surface vessel can be greatly extended.

Still further objects and advantages of the invention reside in the details of construction and combination of parts employed in the mechanism and in their mode of use, as will hereinafter be fully described.

The present underwater scanning mechanism, briefly described, comprises an underwater television camera, together with a plurality of electric, underwater lamps for illumination of a scanned area, protectively mounted for directional adjustment or control in an open cage or frame work that is adjustably suspended from a surface vessel, for depth control, by a cage supporting cable. Also, associated with the cage are four directional movement lines which extend downwardly from the control vessel and are interconnected to the cage by snatch blocks mounted on the cage. The lines then extend laterally at 90° angles to each other, to anchors secured at substantial distance from the surface vessel; these latter lines being individually controlled in length, by winding them onto or from drums on the surface vessel thus to provide for the positioning of the cage at any desired location within the rectangle defined by the four anchored ends of these lines. Furthermore, the cage may be equipped with instruments, as for example, a fathometer and transducer and a remote indicating magnesyn compass. The fathometer will indicate the distance from the cage to the bottom and the compass indicates the direction the camera is pointing.

In accomplishing the various objects of the present invention, I have provided the improved details of construction, the preferred forms of which are illustrated in the accompanying drawings, wherein:

FIG. 1 is a perspective view illustrating the present underwater scanning equipment as suspended from a surface vessel and as anchored for effecting its positioning movements over a designated area.

FIG. 2 is a somewhat enlarged perspective view of the television camera and the illumination means as mounted in the protective cage, and showing the snatch block connection of the directional control lines with the cage.

FIG. 3 is a perspective view of the television camera and electric lamps as associated therewith.

FIG. 4 is a fragmental, perspective view illustrating the mounting of the transducer in the cage.

FIG. 5 is a perspective view illustrating the adjustable members and their gimbal mounting for support of the camera and lamp assembly.

Referring more in detail to the drawings:

In FIG. 1, 10 designates what may be any suitable type of ship or surface vessel from which the present scanning mechanism may be suspended for use. The scanning mechanism is protectively enclosed in an open cage, designated in its entirety by numeral 12, which is adjustably suspended from the surface vessel by a cable 13 which, at its upper end, is wound onto a conventional drum, not shown. The cable 13 may be payed out from or wound onto this drum for establishing the cage at a definite depth. It is shown, particularly in FIG. 2, that the suspending cable 13 is attached at its lower end to a ring 15 from which four short cables 16 extend and are fixed, respectively, to the four upper corners of the cage.

The cage 12 is preferably fabricated from salt water aluminum angle bars joined in open box form. It comprises the four vertical corner posts 17 joined at their lower ends by horizontal side and end bars 18 and joined at their upper ends by similar bars 19.

Mounted substantially centrally within the cage 12, see FIG. 3, is the television camera which is protectively encased in a water-tight case 20. The camera lens is designated at 21. The case 20 is mounted for directional control of the camera by a gimbal construction which includes circular ring 22 and a semi-circular member 23 contained within the ring. The part 23 is pivotally joined to ring 22 at diametrically opposite points by trunnions 24—24 aligned in a vertical plane. The ring 22 is likewise pivotally mounted by horizontally aligned and diametrically opposite trunnions 25—25 which are revolubly mounted in bearings 26 supported by A-frame structures 27—27 mounted on cross-bars 28 extended across the base of the cage.

It is here shown that the television case, or housing 20, is of cylindrical form and that the electric lamps 29—29 embody cylindrical protective cases equally spaced circularly about the television case and fixed in parallel relationship thereto, as shown in FIG. 3. Each lamp case has a light directing lens at its forward end and the lamps are arranged in an endwise, staggered relationship to permit a very close assembly thereof about the camera case. These lamps move in accordance with the directional movements of the camera. Directional adjustment or movement of the camera is made by the pivotal adjustment of the parts 22 and 23 as pivotally mounted on the A-frames 27—27 in the cage as illustrated in FIG. 5. The adjusting means for these parts, as seen best in FIG. 5, comprises the following parts: Pivotally mounted on the extended outer end portion of one of the horizontally aligned gimbal supporting trunnions 25 is a rocker lever 30 which at its upper end is pivotally connected by a laterally directed arm 31 with a frame 32 that is fixed to the upper portion of the near side of the gimbal ring 22. At its lower end, the rocker lever 30 is pivotally connected to the outer end of a piston rod 33 extended from a small hydraulic cylinder 35 pivoted on a cage cross-bar 28. Hydraulic pressure medium may be applied to the opposite ends of cylinder 35 as presently explained, to extend or retract the piston rod and thus to pivotally rock the gimbal ring 22 on its horizontal axis. The inside semicircular gimbal ring 23 is likewise adapted to be pivotally adjusted about its aligned supporting trunnions 24—24 by a small hydraulic cylinder 36 that is shown in FIG. 5 to be pivotally mounted on the frame 32 and from which a piston rod 37 extends and is pivotally attached to the inner ring 23 at a distance spaced from the upper mounting trunnion 24. The rod of this cylinder likewise is adapted to be retracted or extended to effect relative angular adjustment of ring 23 within ring 22. Thus, by swinging of the inner ring 23 in opposite directions, the camera can be swung laterally in opposite directions to scan through a horizontal arc of approximately 65°. The clearly visible area is bounded by the corner posts 17—17. When the camera is pointed downwardly the lateral scanning area is limited by the side bars 18 and 28. The vertical tilting of the camera is through an arc of approximately 95°. The range is from about 5° above horizontal to 90° below horizontal.

For the application of hydraulic pressure medium to the two cylinders 35 and 36, small flexible tubes 40—40' and 41—41', respectively, are extended from the surface vessel to the opposite ends of the cylinders and by suitable pressure and valve means on the vessel the pressure medium may be applied as may be desired to effect the desired directional positioning of the camera relative to the cage in which it is mounted.

The depth of position of the cage is controlled by its suspending cable 13. However, in order to maintain the desired stability of the cage, it is necessary to control the position of the surface vessel from which it is suspended. The control of the surface vessel is effected by anchors and anchor lines. One anchor line 42 is extended directly forward from the bow of the vessel and other lines 43 and 43' are extended laterally and rearward to substantial distances from its stern. This maintains the vessel in fixed position. After the vessel has been properly anchored, the camera stabilizing anchors 45a, 46a, 47a and 48a are ready to be placed at right angles to each other as illustrated in FIG. 1. The lines 45, 46, 47 and 48 are payed out from their respective drums, 45d, 46d, 47d and 48d as each anchor is dropped so that each line becomes the hypothenus of a right angle triangle. The cage is then hoisted for lowering over the side and each line is put through its respective snatch block 49, 50, 51 and 52 mounted on top angle 19 of the cage. The cage is then lowered into the water and as it goes down, the cables on all four drums are allowed to pay out under tension so that by the time camera reaches bottom, the lines 45 to 48 now become the two legs of 4 right angles and the cage is stabilized against pendulous motion, and by taking in and paying out of the proper cables, the cage can be maneuvered under positive control. By the paying out of any of these four lines and winding in the opposite line, the cage can be moved toward the shortening line or lines. If the distance the cage is moved is sufficient to substantially change the depth of the cage, the suspending cable 13 would be adjusted to compensate for such change in depth. In this way, the cage can be moved over a rectangular area that is defined by the four anchors as its corners and the cage is maintained at the desired depth. In a recent operation, working at a depth of 600 feet, it was found possible to scan an area of 16,000 square feet without shifting the position of the surface vessel. It is possible to maintain precision positioning of the cage within a fraction of an inch both as to vertical and horizontal movement by accurate control of the cable winding drums. By using the combination of cage manipulating lines, the movement of the cage is positive and is not affected by under-currents, tides or the like.

It is the intent that a grapple, or the like, be used, if and when desired, in conjunction with the present scanning means and such use has been indicated in FIG. 2 wherein a conventional form of grapple 60 is shown to be releasably secured in open position by an easily breakable tie 61 to the lower cross member 18 of the cage. The grapple shown comprises a pair of coacting jaws joined by crossed and pivoted lever arms about which the ties 61 are applied. The grapple is adapted to be closed by a hydraulic cylinder 65 joined to the upper portions of the lever arms. A grapple lifting cable 66 is shown attached to a chain 67 that extends between the upper ends of the lever arms. When the grapple has been properly positioned for gripping an object, the hydraulic cylinder operates to close the jaws together. The tie 61 may be readily broken by backing the cage away from the gripped object. The cage and camera can, after being backed away, be positioned to view the operation of lifting the object. If desired, the grapple may be secured in fixed relationship to the cage so as to assure that the clamped object is in camera vision as it is being raised. It will be understood that various types of retrieving devices may be secured to the cage in various manners and the particular devices and manner of mounting or use are not particular features of my invention. It is desirable and beneficial that the various devices and tools be so mounted that they are within the view of the camera.

It will also be understood that the particular details of the cage construction and the means for manipulating the cameras may be altered without departing from the teaching of this invention. Further, it is anticipated and acknowledged that similar positive control of the cage can be obtained when using only three guying lines and anchors. This would substantially reduce the scanning area for a given anchor setting. Also, it would not provide the absolute and positive control in all positions which I achieve when using four guying lines on the cage.

What I claim as new is:

1. An underwater television device comprising a cage structure, a supporting cable for raising and lowering said cage, a television camera adjustably mounted within said cage, illuminating means mounted in association with said camera and adapted to be moved in accordance with the movement of said camera, a plurality of cage maneuvering lines, an anchor secured to the outer end of each line, a cable winding drum for each maneuvering line on which the maneuvering line is adapted to be wound in or payed out, said drums being mounted on a surface vessel and block means on said cage for slidably securing the cage to said maneuvering lines intermediate the ends of said lines and each of said lines leading directly from its respective winding drum, through its respective block to its respective anchor.

2. An underwater television device as in claim 1 including a first means for tilting said camera in a vertical plane and a second means for moving said camera in a horizontal plane.

3. An underwater television device as in claim 2 wherein said first means and said second means are independently operable hydraulic cylinders.

4. An underwater television device as in claim 1 including means secured to said cage for grasping an object.

5. An underwater television device as in claim 4 wherein the object grasping means is a hydraulically operable grapple, means securing the grapple to the cage whereby the grapple is freed from the cage incident to the grasping of an object and a grapple lifting line secured to said grapple.

6. An underwater television device as in claim 1 wherein the cage maneuvering lines are three or more.

7. An underwater television device as in claim 1 wherein the illuminating means comprises a plurality of electric lamps and said camera is mounted in a water-tight case and the electric lamps are mounted about the case and directed to illuminate the area in the view of the camera.

References Cited in the file of this patent

UNITED STATES PATENTS

| | | |
|---|---|---|
| 2,004,133 | Romano | June 11, 1935 |
| 2,057,146 | Heath | Oct. 13, 1936 |
| 2,060,670 | Hartman | Nov. 10, 1936 |
| 2,355,086 | Lang | Aug. 8, 1944 |
| 2,433,971 | Adams | Jan. 6, 1948 |
| 2,585,712 | Wiggins | Feb. 12, 1952 |